Nov. 18, 1969     O. C. NIEDERER     3,478,862

EGG ORIENTING EQUIPMENT

Filed Oct. 5, 1967     5 Sheets-Sheet 1

INVENTOR
OTTO C. NIEDERER
BY
*Sperry and Zoda*
ATTORNEYS

Nov. 18, 1969   O. C. NIEDERER   3,478,862
EGG ORIENTING EQUIPMENT
Filed Oct. 5, 1967   5 Sheets-Sheet 2

INVENTOR
OTTO C. NIEDERER
BY
Sperry and Zoda
ATTORNEYS

Nov. 18, 1969          O. C. NIEDERER                3,478,862
                     EGG ORIENTING EQUIPMENT
Filed Oct. 5, 1967                              5 Sheets-Sheet
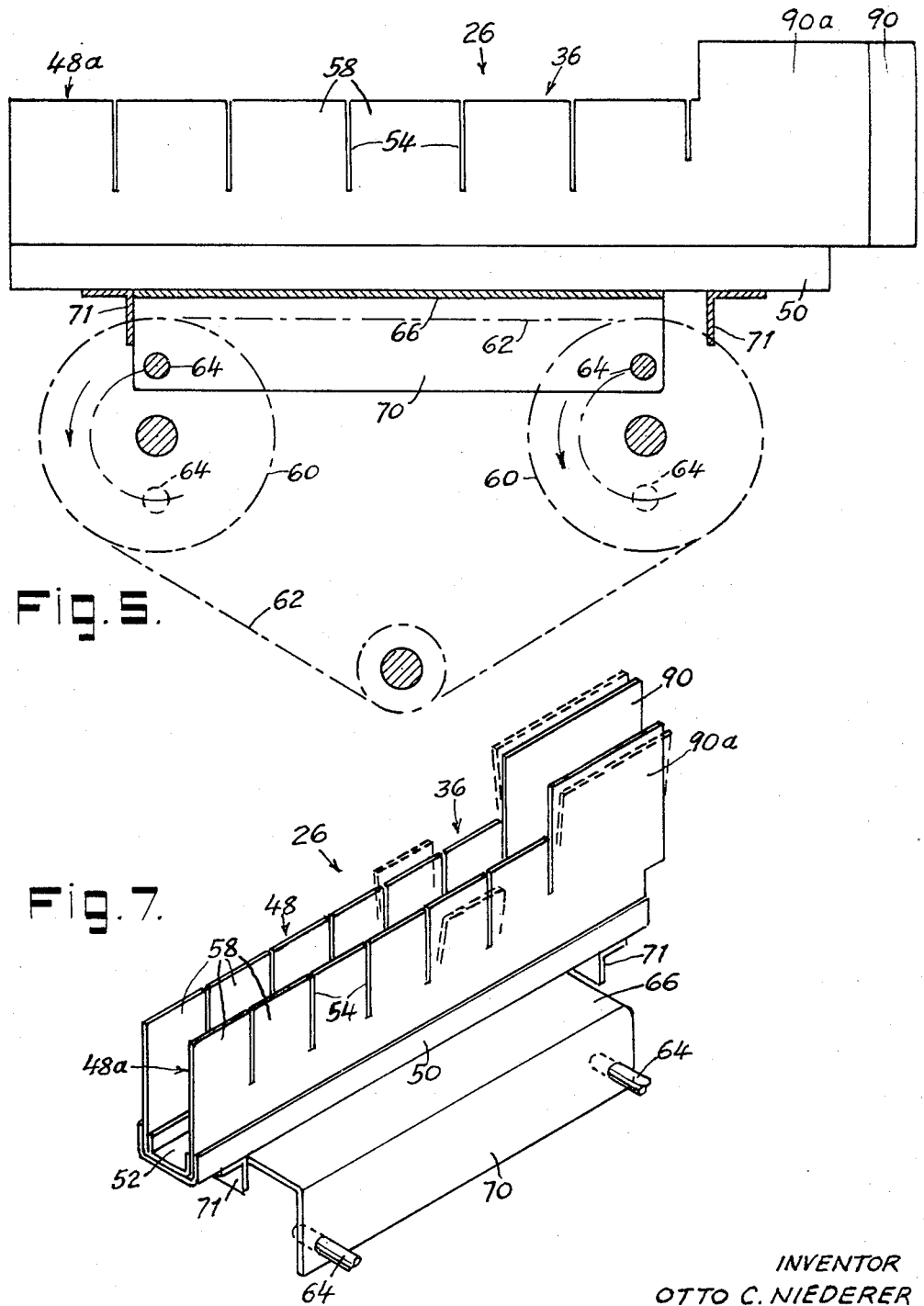
INVENTOR
OTTO C. NIEDERER
BY
Sperry and Zoda
ATTORNEYS Nov. 18, 1969  O. C. NIEDERER  3,478,862
EGG ORIENTING EQUIPMENT
Filed Oct. 5, 1967  5 Sheets-Sheet
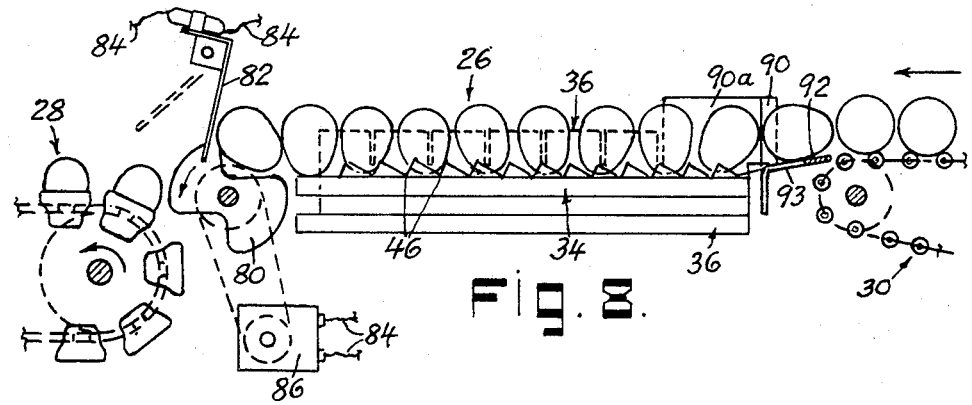
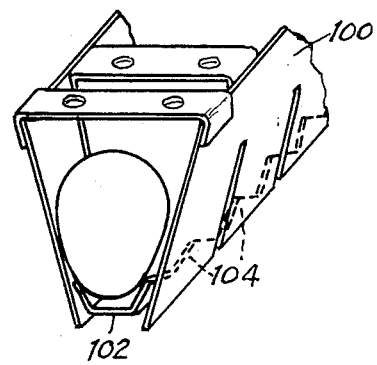
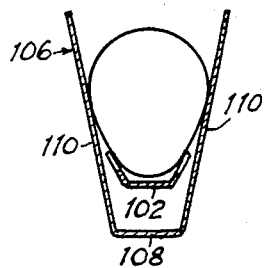
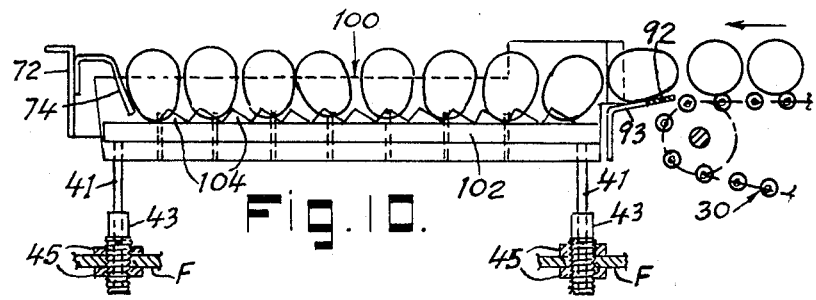
INVENTOR
OTTO C. NIEDERER
BY
Sperry and Zoda
ATTORNEYS

United States Patent Office 3,478,862
Patented Nov. 18, 1969

3,478,862
EGG ORIENTING EQUIPMENT
Otto C. Niederer, Bear Tavern Road,
Titusville, N.J. 08560
Filed Oct. 5, 1967, Ser. No. 673,193
Int. Cl. B65g 47/24
U.S. Cl. 198—33    10 Claims

ABSTRACT OF THE DISCLOSURE

Equipment for conveying, arranging, orienting and otherwise handling eggs wherein egg receiving channels are provided with egg supporting means along which eggs are movable. Egg moving means having transversely yieldable spaced egg lifting members located on opposite sides of said egg supporting members. The egg moving means is preferably elongated to engage a plurality of eggs and is movable in a cyclic path to engage the opposite sides of the eggs so as to cooperate with the egg supporting means to at least partially raise and move the eggs lengthwise of the channels and/or into predetermined arrangements or similarly oriented positions within the channels.

DESCRIPTION OF THE PRIOR ART

Many different types of equipment have heretofore been employed for conveying, arranging or otherwise handling eggs during or preparatory to washing, candling, grading and packing operations. For this purpose various devices have been employed such as those disclosed in the issued patents, Nos. 3,155,102 and 3,316,688. In further types of such equipment the eggs are passed between spaced elements which engage the eggs at opposite sides thereof so as to contact the eggs at their points of largest diameter and aid in orienting the eggs as they move through equipment as exemplified by applicant's Patent No. 3,260,348 and copending application Ser. No. 596,545 now issued as Patent No. 3,369,644.

While such equipment has enjoyed considerable commerical success it is generally of a rather specialized nature and not readily adapted for widely different uses and applications without substantial change or modification.

SUMMARY OF INVENTION

In accordance with the present invention simple and economical egg handling means are provided which are of a versatile nature adapting them for various uses by themselves and in combination with many other types of equipment. Thus the present invention may be employed to convey or arrange or to orient eggs, or to accomplish two or more such operations simultaneously. For this purpose the eggs to be handled are moved along one or more channels between yieldable or flexible egg moving members which are located on opposite sides of the channels. Egg supporting members are located between the egg moving members whereas the egg moving and supporting members are relatively movable in a cyclic manner to advance the eggs along the channels step by step with each cycle of operation. The yieldable egg moving members engage the eggs at the opposite sides thereof in a gentle manner which permits the eggs to move with respect thereto and into similar oriented positions. At the same time holding means may be located in each channel in position to be engaged by the foremost egg therein so as to oppose continued movement thereof along the channel. The holding means then cooperates with the egg moving means to cause the eggs to shift and arrange themselves in an orderly and oriented manner permitting them to be discharged or removed from the channels by manual or automatic means as desired for packing or for transfer of groups of eggs manually or otherwise to other locations or equipment.

DESCRIPTION OF THE DRAWINGS

FIGURE 6 is a perspective of the egg supporting means of the equipment shown in FIGS. 4 and 5;

FIGURE 7 is a perspective of the egg moving means of the equipment of FIGS. 4 and 5;

FIGURE 8 is a longitudinal sectional view similar to FIG. 5 wherein an alternative form of egg holding means is used in combination with egg packing equipment;

FIGURE 9 is a transverse sectional view through an alternative form of egg conveying and handling means embodying the present invention;

FIGURE 10 is a side elevation of the alternative construction shown in FIG. 9;

FIGURE 11 is a transverse sectional view of a third form of egg conveying and handling means.

PREFERRED EMBODIMENTS OF THE INVENTION

Figure 1:
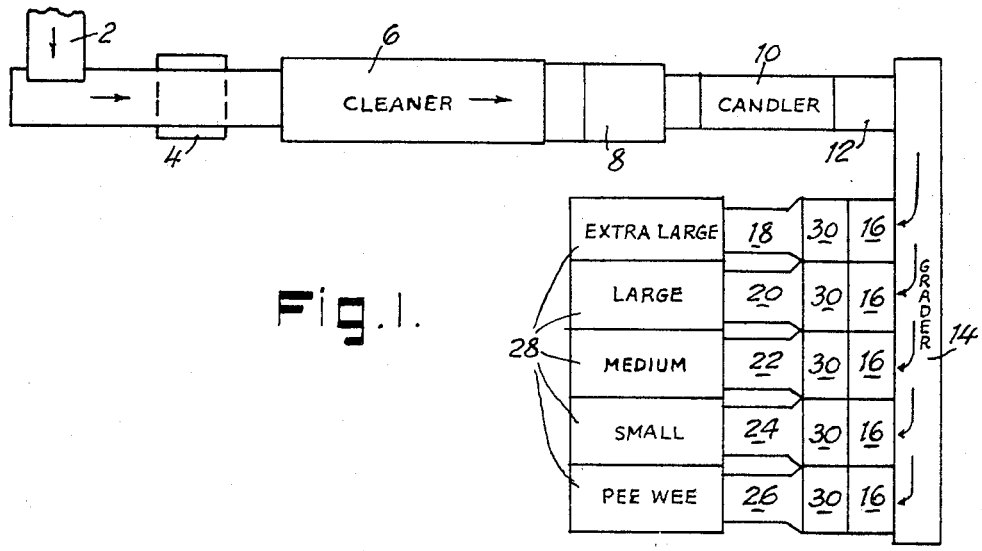
FIGURE 1 is a diagrammatic plan view of egg handling equipment wherein devices embodying the present invention may be employed at various locations.
Figure 2:
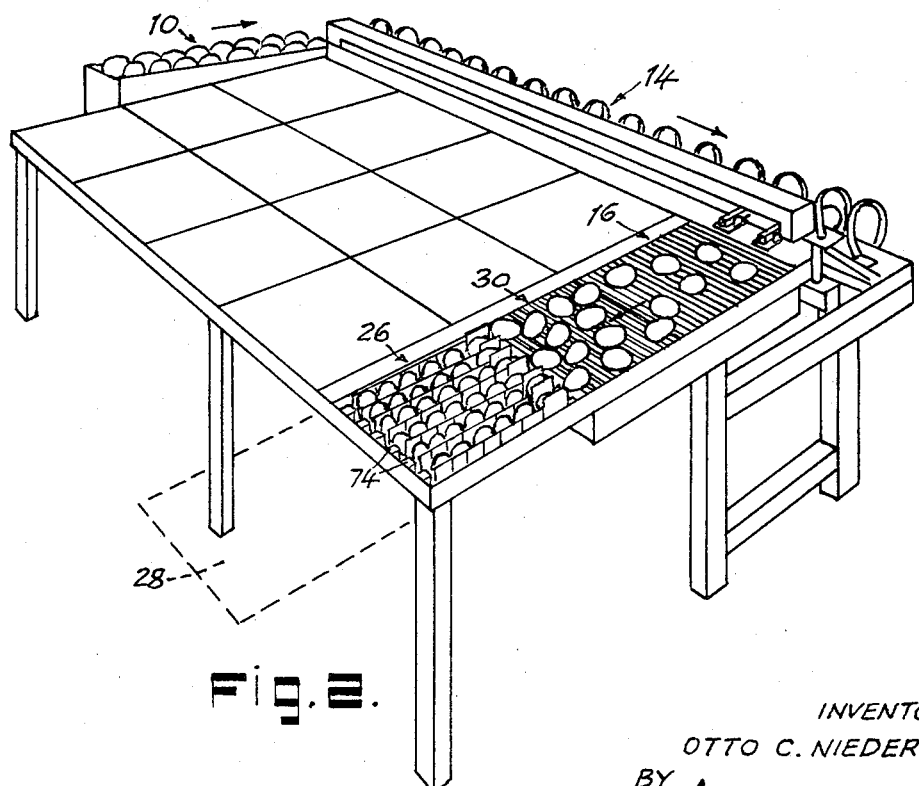
FIGURE 2 is a perspective view of one portion of the equipment shown in FIG. 1.

Those forms of the invention chosen for purposes of illustration in the drawing are adapted for use in various locations and for various purposes as indicated diagrammatically in FIG. 1. As there shown, eggs are received from a source of supply 2 such as the egg collector of a hen house. The eggs are passed to a unit 4 of the present invention which may serve to convey eggs and arrange them in rows for passage through an egg cleaner 6 which may be of any preferred or conventional type. From the egg cleaner 6 the eggs are fed to a second unit 8 which serves to convey the cleaned eggs in a predetermined arrangement to an egg candler 10. From the candler 10 the eggs are moved by the unit 12 in an orderly manner to an egg grader 14 which may, for example, be of the type shown and described in U.S. Patent No. 2,843,250. The egg grader serves to sort the eggs by weight into a plurality of sizes, such as "Extra Large," "Large," "Medium," "Small," and "Pee Wee" eggs, which as shown in FIG. 2 are delivered by a conveyor or other means 16 to each of the units 18, 20, 22, 24 and 26. These latter units serve to advance, orient and arrange eggs in a predetermined manner for delivery to individual egg packers 28 for each size of egg, or for manual or automatic transfer of groups of the oriented and arranged eggs to egg cartons or other equipment by means of vacuum egg lifters or the like.

Each unit of the equipment employed to convey, arrange or orient eggs for transfer from one device or location to another may embody one or a plurality, say six, channels through and along which the eggs are moved. For purposes of illustration and description the units embodied in the system of FIG. 1, may each be of the type shown in detail in FIGS. 3 to 8 of the drawings.

As there shown the eggs received from the egg grader 14 are moved by the conveyor 16 to the coiled spring conveyor and feeding means 30 which may be of the general type shown and described in applicant's copending application, Ser. No. 584,581 now Patent No. 3,428,162. From the egg feeding means 30 the eggs are divided and directed into six channels 32 of one of the units 18, 20, 22, 24 or 26, as for example the unit 26.

Each of the channels 32 of each unit includes an inner egg supporting means 34 and an outer egg moving means 36 which cooperates with the egg supporting means 34 to function as an egg-orienting means. The egg supporting means 34 is stationarily mounted, while means 36 is mounted for cyclic motion. Egg supporting means 34 preferably is U-shaped in cross-section and is formed with a base 38 having upwardly extending side flanges 40. Fixed to the ends of the base are depending pins 41 (FIG. 10) removably seated in sleeves or sockets 43 fixedly secured to the main frame F of the apparatus. The sleeves can be mounted for vertical adjustment in the frame, as by means of threads on the sleeves receiving frame-engaging nuts 45.

Egg positioning members 42 in the form of flat strips of material are located at opposite sides of the egg supporting means 34 and project vertically upward adjacent the opposite side flanges 40. The strips 42 are held in place by retaining means in the form of an inverted channel member 44. The egg positioning members 42 project above the channel member 44 and each presents an upwardly facing series of similar egg receiving recesses 46 spaced apart longitudinally of the strips a distance of approximately 1¾ inch—that is, a distance substantially equal to the largest diameter of an average egg to be handled by the equipment. On the other hand the strips or egg positioning members 42 are spaced apart transversely of the egg supporting means a lesser distance than the largest diameter of an egg of the size to be handled by the apparatus—say about 1⅛ inch for an average egg—whereby the rounded sides of each egg will project outwardly beyond the outer sides of the egg supporting members.

Figure 4:
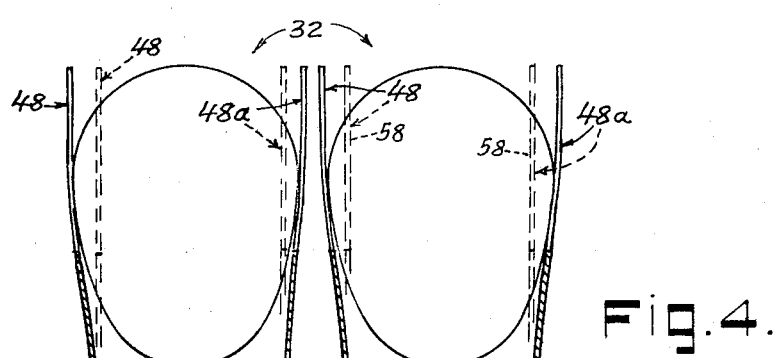
FIGURE 4 is a transverse sectional view of two adjacent channels of the unit shown in FIG. 3, taken on the line 4—4 thereof.
Figure 5:
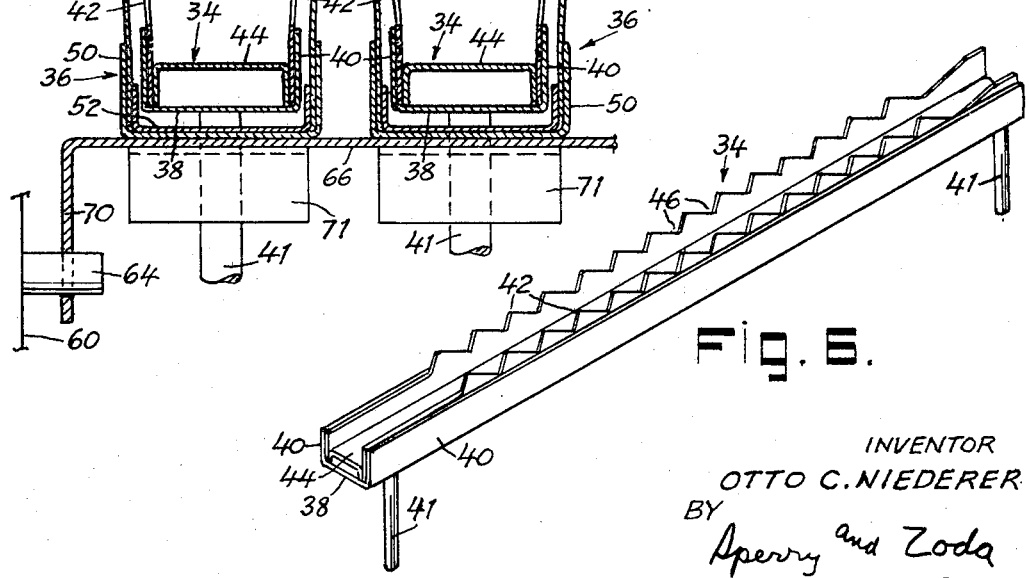
FIGURE 5 is a longitudinal sectional view through the equipment illustrated in FIG. 3 taken on the line 5—5 thereof.
Figure 12:
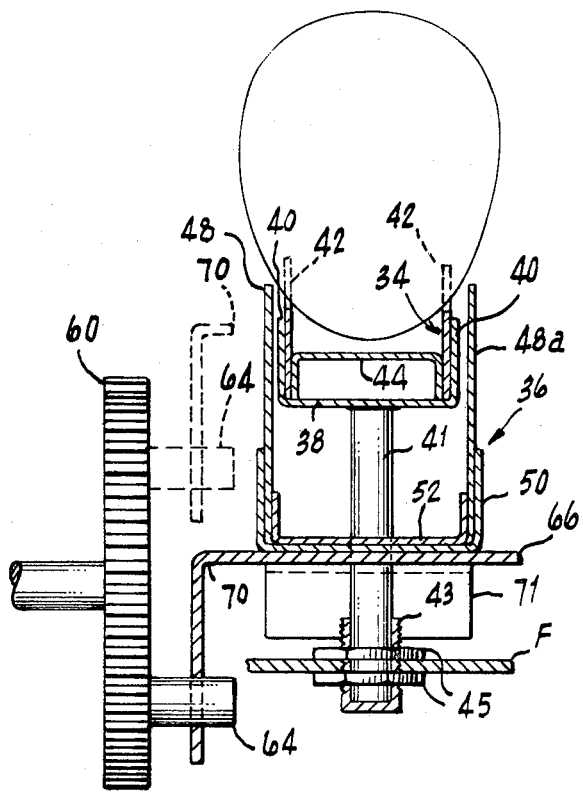
FIGURE 12 is a view similar to FIGURE 4, illustrating the relative positions of the egg supporting means and the egg moving means when the egg moving means is in its lowermost position.

The egg supporting means 34 are stationarily supported as described above in parallel positions on the frame of the unit with each means 34 positioned between the parallel side members 48 of an egg moving and orienting means 36. Thus, as shown in FIG. 4, the egg moving means 36 may embody an upwardly facing U-shaped channel member 50 within which is positioned an inner upwardly facing U-shaped channel member 52. The side members 48 of the egg moving means are held in place between the upwardly extending sides of the channel members 50 and 52 so as to be secured in parallel relation at opposite sides of the channel 32 and in position to project upwardly adjacent and beyond the egg positioning members 42 and adjacent the outer sides thereof. The side members 48, 48a are spaced apart transversely of the channels 32 a distance slightly greater than the spacing of the egg positioning members 42 so as to permit free relative movement of the side members with respect to the egg positioning strips 42 of the egg supporting means 34. However, the spacing of the side members 48, 48a is preferably also less than the largest diameter of an average egg. Thus the side members may be spaced apart a distance of, say, 1⅝ inch.

The side members 48, 48a are preferably in the form of thin, flat, flexible strips of sheet material such as plastic composition reinforced with fiber glass or the like, although the members 48, 48a may be formed of other than sheet material such as sheet metal, fiber board or the like if desired.

The side members 48, 48a of the egg moving means 36 are slotted vertically as shown at 54 and at points which preferably are spaced apart, longitudinally distances corresponding to the spacing of the recesses 46 in the egg positioning members 42 and approximately equal to the average diameter of eggs being handled by the equipment—that is about 1¾ inch. In this way the side members 48, 48a of the egg moving means 36 are provided with flexible and transversely yieldable egg engaging fingers 58 which are located at opposite sides of each channel 32 in position to engage the opposite sides of the eggs resting in the recesses 46 of the egg supporting means 34 and at points on the eggs where they are of largest diameter.

The egg moving means 36 with its channel member 50, side members 48, 48a and their yieldable fingers 58, are movable in a vertical plane and in a cyclic manner by means of driving elements such as gears 60 driven by a chain 62. The gears 60 are located at opposite sides of the unit and have rods 64 eccentrically mounted in similar positions thereon. The rods 64 project inwardly through downwardly extending flanges 68 and 70 at opposite sides of a plate 66 upon which the channel members 50 of the egg moving means 36 rest. The channel members 50 are slidable longitudinally with respect to the plate 66 and have abutment members 71 projecting downwardly therefrom and spaced apart longitudinally a distance somewhat greater than the length of the plate 66. Accordingly, upon rotation of the gears 60, rods 64 cause the plate 66 and the egg moving members 36 resting thereon to move upwardly, forwardly, and downwardly with respect to the stationary egg supporting members 34. However, the spaced abutment members 71 afford a lost motion connection between the channel members 50 and the plate 66 whereby the plate 66 is permitted to slide longitudinally beneath the channel members 50 to afford a limited frictional movement of the egg moving means in a forward direction overcoming any tendency for the egg moving means to positively thrust the eggs forwardly against the members 72 at the ends of the channels 32 in a manner which might crush or damage the eggs during the movement thereof. Furthermore, in the event any of the channels 32 are not filled with eggs, the egg moving means 36 in the partially empty channels are permitted to move freely to continue to advance eggs into the channels to fill the same. At the same time the eggs in those channels which are already filled will be subjected to a limited idling and forward movement which is insufficient to damage or cause checking or cracking of the eggs in the filled channels. In this way the equipment serves to assure the complete filling of all of the channels 32 which are being supplied with eggs. The proximity of the side flanges 40 to side members 48, 48a and to the channel member 52 (see FIG. 4) is such that the egg moving means 36 is guided by flanges 40 and thus kept in a straight line, substantially in longitudinal alignment with the egg supporting means 34, during its cyclic motion.

Further, the eggs themselves, engaging the side members 48, serve to align the associated means 34 and 36 longitudinally.

During such cyclic movement of the egg moving means 36 and side members 48, 48a, the yieldable fingers 58 are moved upward into engagement with the rounded sides of the eggs which project outwardly beyond the sides of the egg supporting member 34 as shown in full lines in FIG. 4. As the fingers 58 move upwardly and forwardly in each cycle of movement of the egg moving member 36, the fingers 58 yieldably engage, lift and advance the eggs so as to move each egg forward along the channel 32 and from one of the recesses 46 of the egg supporting member 34 to another. Thereafter, the egg moving means and its side members 48, 48a move downward and rearward. As a result the eggs supported by the egg supporting means 34 are positioned in advanced recesses 46 of the egg positioning members 42.

Secured to the underside of each channel member 50 are transverse abutments 71. These are beyond the front and rear edges of plate 66. Thus, when plate 66 moves forwardly and rearwardly it shifts the means 36 thereby by engaging abutments 71 thereof. The abutments are so spaced as to provide for lost motion between the plate 66 and channel 50, this being desirable to allow continued forward movement of plate 66, to assure maximum though gentle pressure of the eggs in a forward direction.

This step by step movement of the eggs along each of the channels 32 serves to advance the eggs as a conveying means. At the same time the action of the fingers 58 in engaging the eggs at their points of largest diameter serves to lift the larger ends of the eggs upward while allowing the eggs to pivot about their points of contact to orient the eggs so that the larger ends of all of the eggs may be caused to face in the same direction.

When the eggs in the channels 32 are insufficient in number to fill the channels, they of course tend to rest on the egg supporting member with the long axes thereof extending substantially horizontally and lengthwise of the channel. However, when the end of the channel 32 is closed by egg holding or retarding means the action of the egg lifting means serves to raise and move the eggs forward until the foremost egg engages an abutment or holding means. When manual transfer of the eggs from the various units is desired, it is usual to close the ends of the channels by means of a plate 72 or the like provided with inwardly facing curved or inclined abutment members 74 at the end of each channel 32 as shown in FIG. 10. The limited pressure of the forwardly moving eggs in the channels 32 then serves to thrust the eggs up against the abutment member 74 whereupon the eggs shift about until they assume upright positions with their long axes vertical and with the eggs in direct contact with each other. The eggs are thereby arranged and oriented in such a way as to permit them to be removed and transferred to cartons or other equipment by means of manual or automatic means such as conventional vacuum egg lifters, not shown.

Plate 72 is bodily removable to facilitate cleaning and/or removal of the means 34, 36. To this end I may provide depending pins 75 of plate 72 which seat removably in sleeves, not shown, similar to the arrangement of pins 41 and sleeves 43.

When the eggs arranged as described in the units are to be transferred in groups to egg packing equipment or the like, such as that shown and described in U.S. Patent No. 3,316,688 or applicant's copending application, Serial No. 584,581, the abutment or holding means in each channel 32 of the unit may be of a movable type as shown at 80 in FIG. 8. For this purpose a sensing element 82 may be located in position to be engaged by the foremost egg in each channel upon engagement thereof with the holding means 80. The sensing elements 82 are preferably electrical connected in series to cause an electrical circuit to be completed when a complete set of eggs is present at the end of each channel 32. The circuit 84 including the sensing elements 82 controls the operation of actuating means 86 which serve to move the holding elements 80 to a release position whereby a set of eggs, consisting of the foremost egg in each channel 32, may be transferred from the unit 22, or from any of the other units 18, 20, 24 and 26, for delivery to a packing conveyor or other means such as the egg packer 28 described more fully in said Patent No. 3,316,688 and said application, Ser. No. 584,581.

The construction thus provided is also adapted for use in any of the locations 4, 8 or 12 for the purpose of conveying or advancing the eggs from one device to another whereas the eggs may be suitably oriented or arranged as required for passage through, or handling by, any type of equipment desired.

Figure 3:
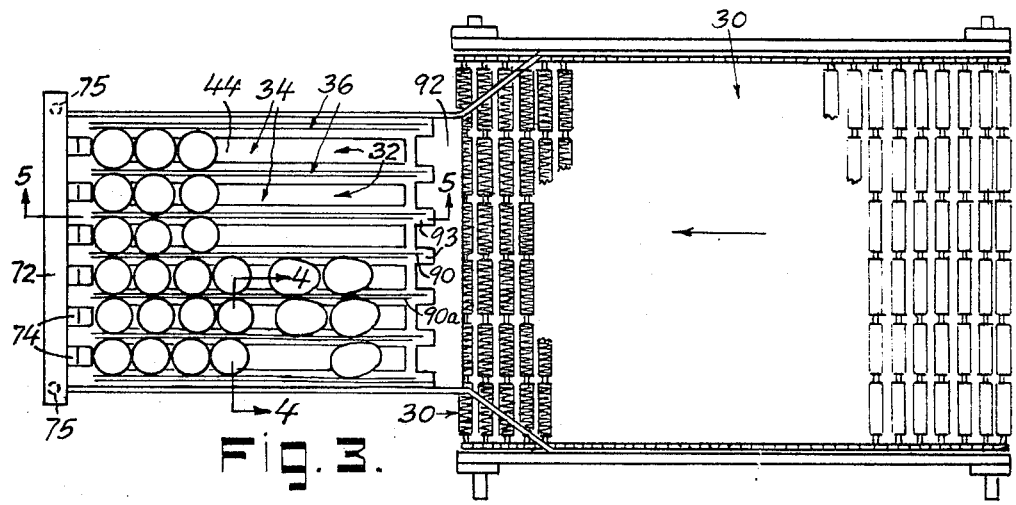
FIGURE 3 is a plan view of one unit of the assembly illustrated in FIG. 2.

It will further be noted that the side members 48, 48a of the egg moving means 36 may be provided with extensions 90, 90a which project rearwardly over a transfer plate or the like 92 spanning the space between a conveyor, such as the egg feeding means 30 of FIG. 3 and the egg supporting means 34 of the units. The side members 48, 48a of adjacent egg moving means 36 thus constitute transversely flexible, channel-defining and egg-displacing means. The extensions 90 move in a cyclic manner with the side members 48 of the egg moving means 36 and thus serve to displace the eggs approaching the channels of the unit. Slots 93 in plate 92 provide clearances for extensions 90, 90a during the cyclic motion thereof.

Extensions 90a have less rearward projection than do extensions 90. This is to prevent an egg from being held by the extensions 90, 90a in a position fully broadside to the channel entry defined therebetween. By offsetting the rear edges of extensions 90, 90a the egg cannot assume such a position and will at the worst be merely oblique to the length of the channel. This oblique position does not prevent the egg from entering during continued operation, as distinguished from a position perpendicular to the channel length.

In this way crowding and congestion of the eggs being moved toward the channels 32 of the units is prevented and a continuous flow of eggs into the various channels is assured.

While the side members 48 of the egg moving means 36, and the transversely flexible egg engaging fingers 58 thereof, have been shown (see the dotted line positions thereof in FIG. 4) as being normally located in parallel vertical planes, they may if desired be inclined either inwardly or outwardly with respect to each other, if desired. However, they should in any event be formed and arranged to engage the sides of the eggs located in the recesses 46 of the egg supporting means 34 so as to raise the eggs, or at least the larger ends thereof, to advance the eggs and orient them within the channels 32 of the units.

As shown in FIGS. 9 and 10 of the drawings it is further possible when desired to employ egg moving means 100 which are located above the egg supporting means 102 and present downwardly projecting egg raising fingers 104 movable into and out of engagement with the eggs on the egg supporting means 102. The fingers 104 are, of course, transversely flexible to permit them to pass downward about the outwardly projecting sides of the eggs and to thereafter raise the larger ends of the eggs as the egg moving means 100 is moved in a cyclic path and in a vertical plane above the egg supporting means 102.

Further, as shown in FIG. 9 the side members and fingers 104 of the egg moving means 100 may be inclined inwardly toward each other so that the inwardly facing sides of the fingers will engage the eggs even though the lower and inner ends of the fingers 104 do not pass upward beyond the egg supporting means 102. The action of the egg moving means in engaging, advancing, orienting and arranging eggs upon cyclic movement of the egg moving means will nevertheless be essentially similar to that of the form of the equipment illustrated in FIGS. 3 to 8.

As shown in FIG. 11, the egg moving means (here designated 106) can be an integral component of U-shaped cross-section having a bight part 108, and side members 110. These may be either vertical, or inclined as shown.

It will accordingly be apparent that the various elements of the equipment may be changed in their form, construction, and arrangement to assure the proper or desired movement and arranging of eggs for many different egg handling purposes. In view thereof it should be understood that the particular embodiments of the invention which are shown in the drawings and described above are intended to be illustrative only and are not intended to limit the scope of the invention.

It is important to note that the construction facilitates cleaning of the apparatus if for example an egg is broken therein. Plate or bar 72 lifts off bodily, after which the affected egg support means 36 is lifted out, since it is mounted merely by seating of its pins 41 in sockets 43. Pins 41, it may be noted, are located beyond the ends of the associated egg moving means 36.

Thereafter, the affected means 36 may be lifted off the plate 66 supporting the several means 36 of the apparatus.

It is further to be understood that the cyclic motion of means 36 need not be in the circular path shown. It may be in an elliptical path, or perhaps a rectangular path. It is mainly important that the eggs be engaged and advanced in such manner as to orient them in the manner described, and thus the particular cyclic motion may be different from that shown and yet produce the desired results. Or, the means 36 might be stationary with the means 34 being the part having the cyclic motion. Still further, both the means 34 and the means 36 may move in a cyclic motion relative to one another.

I claim:

1. Equipment for use in handling eggs comprising means defining a channel along which eggs are movable, stationary egg supporting means in said channel, egg orienting means including transversely spaced members located at opposite sides of said egg supporting means and presenting inwardly facing egg engaging surfaces at least a part of which surfaces are spaced apart a distance less than the diameter of the eggs in said channel, and means for moving said egg orienting means relative to the stationary egg supporting means through a cyclic path in a vertical plane into and out of engagement with said eggs located on said egg supporting means so as to move the eggs with respect to said egg supporting means.

2. Equipment as defined in claim 1 wherein said transversely spaced members are yieldably movable toward and away from each other.

3. Equipment as defined in claim 1 wherein said egg orienting means embodies spaced longitudinally extending strips of material engageable with a plurality of eggs to move said plurality of eggs simultaneously with respect to said egg supporting means.

4. Equipment as defined in claim 1 wherein said egg orienting means embody a plurality of transversely spaced and yieldable egg engaging fingers.

5. Equipment as defined in claim 1 wherein said egg supporting means presents a plurality of equally spaced egg positioning recesses in adjacent locations longitudinally of said channel, and said egg orienting means embodies a plurality of pairs of transversely spaced and relatively yieldable egg engaging fingers located at opposite sides of the egg positioning recesses of said egg supporting means.

6. Equipment as defined in claim 1 wherein abutment means are located in said channel near one end thereof in position to be engaged by the foremost egg in the channel and cooperating with the egg orienting means to cause eggs in said channel to assume positions wherein the long axes of the eggs extend vertically upon continued movement of eggs toward said abutment means within said channel.

7. Equipment as defined in claim 6 wherein said abutment means presents an inwardly facing upwardly inclined egg engaging surface.

8. Equipment as defined in claim 1 wherein there are a plurality of adjacent and parallel channels and egg supporting means in each channel presenting similar egg positioning recesses cooperating with the egg orienting means associated with each channel to arrange eggs in said channels in a predetermined arrangement facilitating packing of the eggs.

9. Equipment as defined in claim 8 wherein abutment means are located near the end of each channel in position to be engaged by the foremost egg therein and cooperating with said egg orienting means to cause the eggs in said channels to move into positions wherein the long axes thereof extend vertically upon continued movement of eggs along said channels.

10. Equipment as defined in claim 9 wherein said abutment means are movable to permit the simultaneous discharge of the foremost egg from each channel.

References Cited
UNITED STATES PATENTS 2,722,406    11/1955    Kurek _____ 198—219
3,369,644    2/1968    Niederer _____ 198—33

RICHARD E. AEGERTER, Primary Examiner

U.S. Cl. X.R.
198—219